June 13, 1961 — K. O. MATZ — 2,988,401
WEIGHT FOR VEHICLE WHEEL
Filed Feb. 13, 1959 — 2 Sheets-Sheet 1
FIG. 1
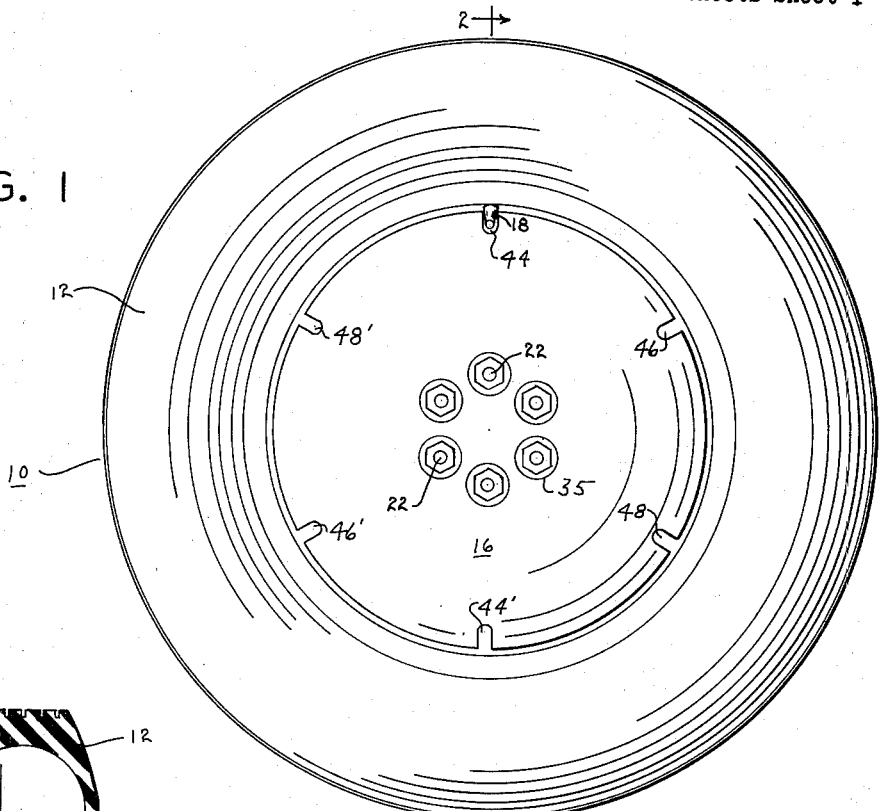
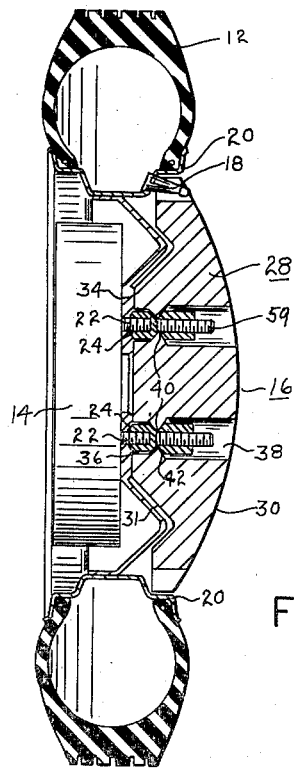
FIG. 2
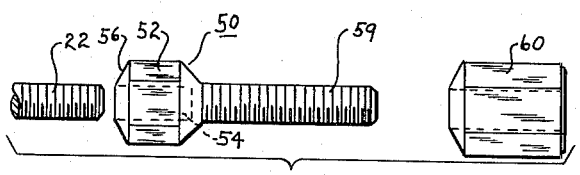
FIG. 3
*INVENTOR.*
KENNETH O. MATZ
BY *M. A. Hobbs*
ATTORNEY June 13, 1961  K. O. MATZ  2,988,401
WEIGHT FOR VEHICLE WHEEL Filed Feb. 13, 1959  2 Sheets-Sheet 2

*INVENTOR.*
KENNETH O. MATZ
BY
M. A. Hobbs
ATTORNEY

United States Patent Office 2,988,401
Patented June 13, 1961

2,988,401
WEIGHT FOR VEHICLE WHEEL
Kenneth O. Matz, R.R. 2, Bremen, Ind.
Filed Feb. 13, 1959, Ser. No. 792,994
9 Claims. (Cl. 301—41)

The present invention relates to vehicle wheels and more particularly to a means of improving the traction of the rear wheels of an automobile, and the like.

One of the principal objects of the present invention is to provide accurately balanced weight means for the rear wheels of an automobile, which can readily be mounted and centered on the wheel of a conventional or standard automobile without making any change in the wheel construction and which can easily be removed when additional weight on the wheel is unnecessary.

Another object of the invention is to provide a relatively simple weight means for additional effective traction for the rear wheels of an automobile, which employs the studs or bolt sockets used in securing the wheels to the hub or axle and which, when mounted on the wheels, assumes the appearance of the conventional hub cap.

Still another object of the invention is to provide weight means for the wheels of automobiles and the like which can be easily adapted to most present day conventional automobile wheels and which can be mounted on and demounted from the wheels without the use of any special tools, equipment or mechanical skill.

A further object is to provide a means for improving the traction of the drive wheels of automobiles and the like which does not extend appreciably beyond the outside plane of the wheel or tire and which contacts the wheel only at points near the center of the wheel or adjacent the hub.

Another object of the invention is to provide a weight means of the aforesaid type which can be used over extended periods of time and under varying weather conditions without removing and remounting the means and which does not mar the wheel nor adversely affect the operation of the automobile.

Additional objects and advantages of the invention will become apparent from the following description and accompanying drawings, wherein:

FIGURE 1 is a side elevational view of an automobile wheel on which my weight means is shown in elevation mounted in operative position;

FIGURE 2 is a vertical cross sectional view of the wheel shown in FIGURE 1 and my weight means mounted thereon; taken on line 2—2 of FIGURE 1;

FIGURE 3 is a side elevational view of one of the fixtures for securing my weight means to the vehicle wheel;

Figure 4:
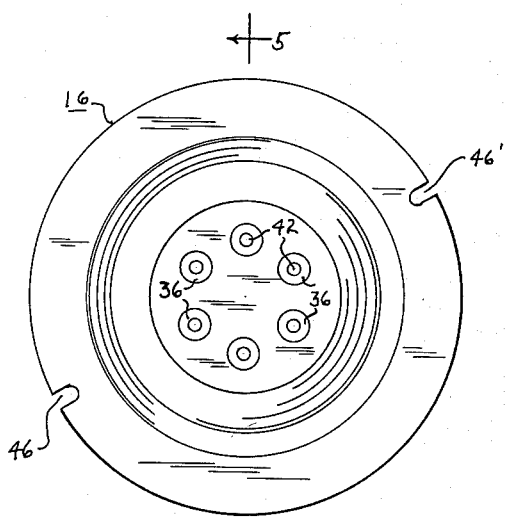
FIGURE 4 is a side elevational view of my weight means, showing the side thereof opposite that shown in FIGURE 1.
Figure 5:
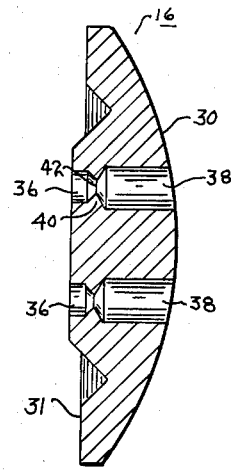
FIGURE 5 is a vertical cross sectional view of the weight means, taken on line 5—5 of FIGURE 4.

Referring more specifically to the drawings, numeral 10 designates the rear wheel of an automobile, pick-up or panel truck, 12 a standard tire mounted on the wheel and inflated, 14 the hub of the wheel secured to the rear axle of the automobile or the like, and 16 my weight means mounted on the hub in operative position. The wheel, tire and hub for the purpose of the present description are considered to be conventional, and the design and construction shown are typical for those parts as used on automobiles, pick-up and panel trucks. While the present invention is primarily intended for use on these designated vehicles, it can be adapted to larger vehicles such as trucks and tractors, and throughout the specification and claims the term "automobile" is intended to include any vehicle on which the present weight means is adapted to be used. The tire shown in the drawing is a tubeless type pneumatic tire having a valve stem 18 extending through the rim 20 of the wheel. In most conventional or standard automotive wheel construction, the wheel is secured to the hub or axle by four, five or six bolts or studs, the one shown in FIGURES 1, 2 and 3 consisting of six studs 22 equally spaced from the center and from each other and having a nut with a conical portion for engaging a conical portion 24 surrounding each stud hole in the wheel. The studs normally extend about an inch outwardly from the hub and do not extend appreciably beyond the outer end of the tightened nut.

Figure 6:
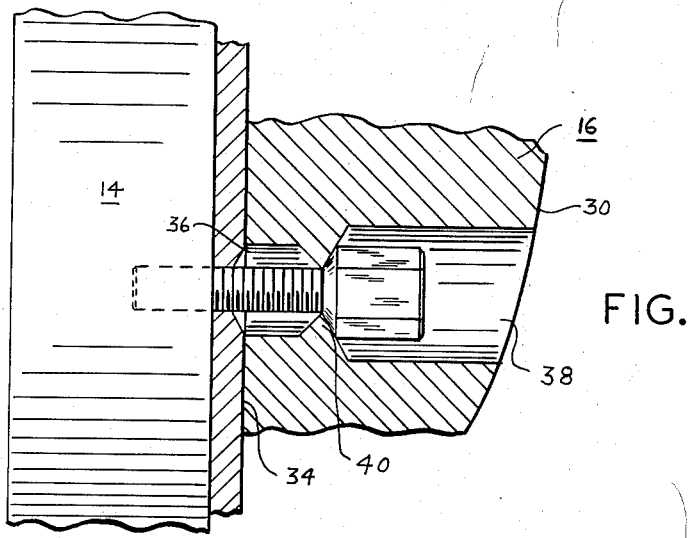
FIGURE 6 is an enlarged fragmentary cross sectional view of my weight means and vehicle wheel, showing a modified fixture for securing the weight means onto the hub of the wheel.

The embodiment of the present invention shown in the drawings consists of a one-piece, substantially disc-shaped body 28 of iron or steel, the outer surface 30 of which is convex and assumes the appearance of the conventional hub cap, and the inner surface 31 of which preferably follows generally the contour of the wheel; the latter curvature, however, is not important so long as the body can seat firmly against the outside surface of the wheel near the center 34 thereof, as shown in FIGURES 2 and 6 of the drawings. In the weight means illustrated, the body contains six holes 35 corresponding in position to the holes in the wheel, each hole consisting of inner and outer sections 36 and 38 separated by a partial partition 40, having a central hole 42 for receiving a stud or bolt for securing the weight means onto the hub. Opposed notches 44, 44', 46, 46' and 48, 48' are provided in the periphery of the body for receiving the stem 18 and permitting easy access to the valve stem with the tire gauge and air hose. The notches are in sets of two opposed notches to maintain fine balance of the body; however, either one, two or three sets of opposed notches may be used if desired. It is preferable that the peripheral edge of the body fit close to the rim of the wheel without extending appreciably beyond the outside edge thereof to avoid accumulation of dirt, slush, mud and the like between the body and the rim.

In the embodiment shown in FIGURE 2 studs 22 are permanently mounted on the hub of the wheel and a special type fixture 50 is employed for securing the weight means in place, consisting of a head portion 52 having a threaded bore 54 for screwing onto stud 22 and a tapered end 56 for seating in the conical recess around the stud hole in the wheel. A study portion 59 joined to the outer end of the head portion 52 receives a nut 60 for securing the weight means in place. In mounting the present weight means, using these fixtures, the head portion 52 is threaded onto the studs and tightened in place to secure the wheel on the hub in the usual manner. After all of the fixtures are tightened, the weight means is mounted on stud portions 59 and secured thereon by tightening nuts 60 firmly on stud portions 59. With the weight means mounted on the two rear wheels of the automobile in the manner just described these wheels have substantially improved traction and the automobile has increased maneuverability in adverse driving conditions without any appreciable sacrifice in economy or comfort.

Figure 7:
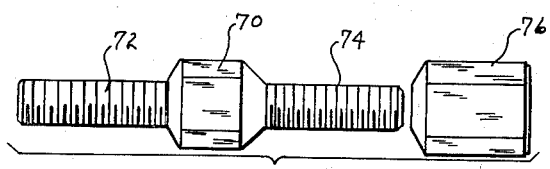
FIGURE 7 is an enlarged elevational view of a fixture for securing the weight means onto the hub of a vehicle wheel, showing a further modified form.

The present weight means will fit in a number of different makes of automobiles, including those having permanent studs or removable bolts for securing the wheels to the hub, only the fixtures for securing the weight means to the wheels being changed. In FIGURE 6 the fixture consists merely of a longer bolt, the head of which seats on the outer surface of partition 40. This type of fixture has the disadvantage of requiring the wheel and weight means to be assembled and bolted on at the same time and of placing substantial lateral force on the bolt away from the hub. The preferred fixture for this type of wheel is illustrated in FIGURE 7, having in effect a head 70 with studs 72 and 74 at each end. With this type, stud 72 can be screwed into the hole in the hub to secure the wheel in place and the weight means can then be mounted on studs 74 and nuts 76 threaded and tightened onto the latter studs to secure the weight means in place. With the latter type of fixture the weight means can be removed without loosening the wheel.

One of the advantages of the present weight means is that it can be accurately machined and balanced in the course of fabrication and, when mounted with the fixtures described above will give long, smooth trouble-free service under most adverse driving conditions. While several changes and modifications have been suggested in connection with the embodiment of the invention described in detail herein, other modifications can be made without departing from the scope of the invention.

I claim:

1. A device for providing additional weight for the rear wheels of an automobile, each wheel having a hub with a plurality of studs for securing the wheel to the hub, said studs being equally spaced from the center of the hub and from each other, comprising a one piece generally disc shaped body having a substantially uniform convex curvature outer surface and a substantially flat central portion on the inner surface, a plurality of holes extending through said body from said outer surface to said inner surface parallel to the axis of the wheel and being in the same relative position as said studs, a partition dividing each of said holes into inner and outer sections and having a center opening, the opposite sides of said partition being tapered generally radially toward each other with said partition being thinnest adjacent said center opening, fixtures in said holes extending through the center opening of said partition for securing said body to the hub, each fixture consisting of a nut for threading onto said studs and adapted to be received in the inner section of the holes in said body, a threaded shaft secured to said nut and extending through said opening into the outer section of the holes in said body, and a nut threadedly received on said shaft for seating on said partition and drawing said body firmly against the hub.

2. A weight means for the power wheels of an automobile, each wheel having a hub with a plurality of studs for securing the wheel to the hub, said studs being equally spaced from the center of the hub and from each other, comprising a one piece generally disc shaped body, a plurality of holes extending through said body from said outer surface to said inner surface parallel to the axis of the wheel and being in the same relative position as said studs, a partition dividing each of said holes into inner and outer sections and having a center opening, the opposite sides of said partition being tapered generally radially toward each other with said partition being thinnest adjacent said center opening, fixtures in said holes extending through the center opening of said partition for securing said body to the hub, each fixture consisting of a nut for threading onto said studs and adapted to be received in the inner section of the holes in said body, a threaded shaft secured to said nut and extending through said opening into the outer section of the holes in said body, and a nut threadedly received on said shaft for seating on said partition and drawing said body firmly against the hub.

3. A weight means for the power wheels of an automobile, said wheel having a hub with a plurality of studs for securing the wheel thereto, comprising a one piece generally disc shaped body, a plurality of holes extending through said body from said outer surface to said inner surface parallel to the axis of the wheel and being in the same relative position as said studs, a partition dividing each of said holes into inner and outer sections and having a center opening, the opposite sides of said partition being tapered generally radially toward each other with said partition being thinnest adjacent said center opening, fixtures in said holes extending through the center opening of said partition for securing said body to the hub, each fixture consisting of a nut for threading onto said studs and adapted to be received in the inner section of the holes in said body, a threaded shaft secured to said nut and extending through said opening into the outer section of the holes in said body, and a nut threadedly received on said shaft for seating on said partition and drawing said body firmly against the hub.

4. A device for providing additional weight for the rear wheels of an automobile, comprising a one piece generally disc shaped body having a substantially uniform convex curvature outer surface and a substantially flat central portion on the inner surface, a plurality of holes extending through said body from said outer surface to said inner surface parallel to the axis of the wheel and being spaced inwardly from the periphery of said body and equally spaced from the center of said body and from each other, a partition dividing each of said holes into inner and outer sections and having a center opening, and fixtures in said holes extending through the center opening of said partition for securing said body to the wheel.

5. A weight means for the power wheels of an automobile, comprising a generally disc shaped body having a substantially uniform convex curvature outer surface, a plurality of holes extending through said body from said outer surface to the inner surface parallel to the axis of the wheel and being spaced inwardly from the periphery of said body and equally spaced from the center of said body and from each other, a partition dividing each of said holes into inner and outer sections and having a center opening, and fixtures in said holes extending through the center opening of said partition for securing said body to the wheel.

6. A weight means for the wheels of an automobile, comprising a generally disc shaped body, a plurality of holes extending through said body from the outer face to the inner face parallel to the axis of the wheel and being spaced inwardly from the periphery of said body, a partition dividing each of said holes into inner and outer sections and having a center opening, and fixtures in said holes extending through the center opening of said partition for securing said body to the wheel.

7. A weight means for the wheels of an automobile having studs for securing said wheels to the hub, comprising a generally disc shaped body, a plurality of holes extending through said body from the outer face to the inner face parallel to the axis of the wheel and being spaced inwardly from the periphery of said body, a partition dividing each of said holes into inner and outer sections and having a center opening, fixtures in said holes extending through the center opening of said partition for securing said body to the wheel, each fixture consisting of a nut for threading onto the studs and adapted to be received in the inner section of the holes in said body, a threaded shaft secured to said nut and extending through said opening into the outer section of the holes in said body, and a nut threadedly received on said shaft for seating on said partition and drawing said body firmly against the hub.

8. A device for providing additional weight for the power wheels of an automobile, said wheel having a hub with a plurality of holes for receiving bolts for securing the wheel to the hub, said holes being equally spaced from the center of the hub and from each other, said device comprising a one piece generally disc shaped body having a substantially uniform convex curvature outer surface, a plurality of holes extending through said body from said outer surface to the inner surface parallel to the axis of the wheel and being in the same relative position as said holes, a partition dividing each of said holes into inner and outer sections and having a center opening fixtures in said holes extending through the center opening of said partition for securing said body to the hub, each fixture consisting of two coaxial threaded shafts, a nut-like member between said shafts and joined integrally therewith, one of said shafts being threadedly received in the holes in said hub, the other of said shafts extending through said opening into the outer section of the hole in said body, and a nut threadedly received on said last mentioned shaft for seating on said partition and drawing said body firmly against said hub.

9. A weight means for the wheels of an automobile having a plurality of holes for receiving bolts for securing the wheel to the hub, comprising a generally disc shaped body, a plurality of holes extending through said body from the outer surface to the inner surface parallel to the axis of the wheel and being in the same relative position as said holes, a partition dividing each of said holes into inner and outer sections and having a center opening, fixtures in said holes extending through the center opening of said partition for securing said body to the wheel, each fixture consisting of two coaxial threaded shafts, a nut-like member between said shafts and joined integrally thereto, one of said shafts being threadedly received in the holes in said hub, the other of said shafts extending through said opening into the outer section of the holes in said body, and a nut threadedly received on said last mentioned shaft for seating on said partition and drawing said body firmly against said wheel.

References Cited in the file of this patent

UNITED STATES PATENTS

| | | |
|---|---|---|
| 1,963,229 | Eksergian | June 19, 1934 |
| 2,107,925 | Ash | Feb. 8, 1938 |
| 2,859,065 | Darby | Nov. 4, 1958 |